(No Model.)

S. D. FIELD.
WIRE COUPLING.

No. 246,484. Patented Aug. 30, 1881.

Witnesses;

Inventor,
Stephen D. Field
by his Attorney,

UNITED STATES PATENT OFFICE.

STEPHEN D. FIELD, OF NEW YORK, N. Y.

WIRE-COUPLING.

SPECIFICATION forming part of Letters Patent No. 246,484, dated August 30, 1881.

Application filed May 31, 1881. (No model.)

*To all whom it may concern:*

Be it known that I, STEPHEN D. FIELD, a citizen of the United States, residing in the city, county, and State of New York, have invented a new and useful Wire-Coupling, of which the following is a specification.

The object of my invention is to provide an improved means of permanently splicing or joining the separate ends of telegraphic or other wires with facility and convenience, and in such a manner that the tensile strength of the line as a whole is not impaired nor the electric conductivity of the joint diminished by oxidation resulting from exposure to the elements.

Telegraphic wires have heretofore been connected by first bending each of the ends to be joined slightly outward from the opposite wire, laying them together and wrapping a thinner wire tightly around them both, securing the ends, and then soldering the whole together. The ends to be joined have also been twisted around each other and soldered, instead of being wrapped or served in the manner described. My invention differs from either of these methods, in that the binding-wire is previously prepared, instead of being wrapped around the ends of the wires at the time the connection is made.

The subject-matter claimed will be hereinafter specifically designated.

Figure 1:
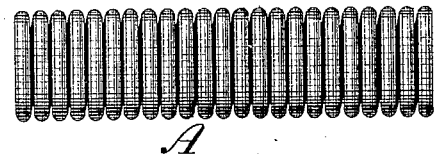
Figure 3:
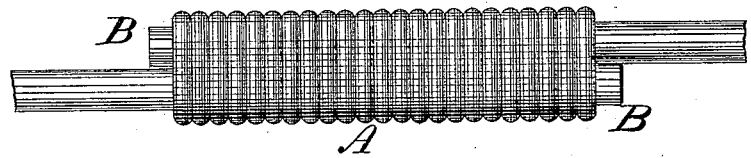
Figure 2:
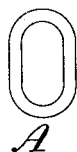
Figure 4:
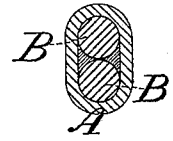

In the accompanying drawings, Figures 1 and 2 represent my improved connector or binder as constructed for application to the ends of the wires. Fig. 3 illustrates the manner of its application thereto, and Fig. 4 is a cross-section of the completed joint.

In the drawings, A represents a binder consisting of a helix of small wire, which is of oblong cross-section. It may be prepared by winding the wire upon a former or mold having a cross-section similar to that of the wires which are to be connected taken together, as shown in Fig. 3. The binder A having been prepared in the manner described, an end, B, of each wire to be joined is placed side by side within it, preferably extending a short distance beyond it, as shown in Fig. 2. The wires and binder, after being placed in this position, are securely soldered together. This forms a solid metallic joint of great tensile strength, which will not be impaired in respect to its electric conductivity by exposure to the elements.

The object of my invention is to require as little of the work as possible to be done when actually joining the wires, which are generally placed in very inconvenient positions. By having the binders previously prepared at the manufactory the only work remaining to be done in the field is to insert the ends of the wires within them and then solder the whole together, whereas in the methods hereinbefore described the ends of the wires must first be bent, then wrapped carefully with the binding-wires, and the whole soldered together, or else the wires must be carefully twisted together and the joint preferably soldered.

My improved connection can be applied to the wires in much less time than those heretofore in use, and possesses great tensile strength, besides forming an excellent electrical contact. It also enables the line-inspector to readily detect unsoldered joints, as my improved binder will not hold the wires together unless soldered, and a joint made in any other manner—as, for example, a twist joint—is readily detected from its different appearance.

I claim as my invention—

As a new article of manufacture, the hereinbefore-described helical binder for uniting the ends of wires.

In testimony whereof I have hereunto subscribed my name this 19th day of May, A. D. 1881.

STEPHEN DUDLEY FIELD.

Witnesses:
WILLIAM H. KENYON,
MILLER C. EARL.